United States Patent
Nguyen

(12) 
(10) Patent No.: US 12,472,658 B1
(45) Date of Patent: Nov. 18, 2025

(54) METHOD FOR THE MODIFICATION OF WOOD MATERIALS TO IMPROVE MECHANICAL PROPERTIES, WATER RESISTANCE AND FLAME RETARDANCY BY UTILIZING A COMBINATION OF MINERALIZATION WITH INFUSION AND POLYMERIZATION OF BIOPOLYMERS

(71) Applicant: Liem Duy Nguyen, Ha Noi (VN)

(72) Inventor: Liem Duy Nguyen, Ha Noi (VN)

(73) Assignee: HEMA HIGH-TECH ECO MATERIALS JOINT STOCK COMPANY, Ha Noi (VN)

( * ) Notice: Subject to any disclaimer, the term of this patent is extended or adjusted under 35 U.S.C. 154(b) by 0 days.

(21) Appl. No.: 19/176,190

(22) Filed: Apr. 11, 2025

(51) Int. Cl.
*B27K 3/32* (2006.01)
*B27K 3/18* (2006.01)
*B27K 3/20* (2006.01)

(52) U.S. Cl.
CPC .................. *B27K 3/32* (2013.01); *B27K 3/18* (2013.01); *B27K 3/20* (2013.01); *B27K 2240/30* (2013.01); *B27K 2240/70* (2013.01)

(58) Field of Classification Search
CPC ... B27K 3/32; B27K 3/18; B27K 3/20; B27K 2240/30; B27K 2240/70
See application file for complete search history.

(56) References Cited

U.S. PATENT DOCUMENTS

| 4,233,752 A | * | 11/1980 | Kleinguenther | F26B 7/00 34/331 |
| 4,752,297 A | * | 6/1988 | Leach | B27K 5/02 8/402 |
| 4,840,637 A | * | 6/1989 | Rolffs | B27K 3/08 8/402 |
| 4,840,638 A | * | 6/1989 | Rolffs | B44F 9/02 8/408 |
| 4,959,076 A | * | 9/1990 | Rolffs | B27K 5/001 8/402 |

(Continued)

FOREIGN PATENT DOCUMENTS

| DE | 10341883 A1 | * | 4/2005 | |
| GB | 2271579 A | * | 4/1994 | A01N 25/00 |

(Continued)

OTHER PUBLICATIONS

Spear et al., "Review of Functional Treatments for Modified Wood," Coatings Nov. 2021, 327. (Year: 2021).*

*Primary Examiner* — William P Fletcher, III

(57) ABSTRACT

A method for the modification of wood materials to improve mechanical properties, water resistance and flame retardancy by utilizing a combination of mineralization with infusion and polymerization of biopolymers comprising steps performed in the following specific order: (i) preparing and pre-treating wood materials, (ii) hardening the pre-treated wood boards via the creation and deposition of mineral crystal or metal oxide inside the wood fiber, (iii) washing with water and drying to a moisture content below 20%, (iv) treating the wood for flame resistance, (v) treating the wood for water resistance, (vi) immersing with the first salt solution, and (vii) drying the treated wood board increasing waterproof and fireproof to a moisture content of 10%±2% to obtain the modified wood.

20 Claims, 2 Drawing Sheets

(56) References Cited

U.S. PATENT DOCUMENTS

| | | | |
|---|---|---|---|
| 7,178,263 B2* | 2/2007 | Asano | B27K 3/163 |
| | | | 34/409 |
| 9,132,569 B2* | 9/2015 | Saari | B27K 3/08 |
| 2012/0023772 A1* | 2/2012 | Abramov | F26B 21/06 |
| | | | 34/92 |
| 2024/0278456 A1* | 8/2024 | Bado | B27K 3/20 |

FOREIGN PATENT DOCUMENTS

| | | | |
|---|---|---|---|
| JP | H08318509 A | * | 12/1996 |
| JP | H09300312 A | * | 11/1997 |

* cited by examiner

METHOD FOR THE MODIFICATION OF WOOD MATERIALS TO IMPROVE MECHANICAL PROPERTIES, WATER RESISTANCE AND FLAME RETARDANCY BY UTILIZING A COMBINATION OF MINERALIZATION WITH INFUSION AND POLYMERIZATION OF BIOPOLYMERS

FIELD OF THE INVENTION

The present disclosure relates generally to materials formed from natural wood, and more particularly, to a method for the modification of wood materials to improve mechanical properties, water resistance and flame retardancy by utilizing a combination of mineralization with infusion and polymerization of biopolymers, in which the wood materials include softwood, and sapwood.

BACKGROUND ART

According to actual statistics, the demand for wood and wooden household products is constantly increasing globally. In Vietnam, in the first 4 months of 2024, the export of wood and wooden products is estimated at 4.8 billion USD, an increase of 23.7% over the same period in 2023. Therefore, when demand exceeds supply, natural wood will become increasingly scarce. To balance, people think of ways to increase the durability of wood to extend its usage time. The emergence of modified wood technology plays an important role in improving the pressure of the wood industry. The modification process has greatly changed the physical, chemical and biological properties of wood. Here are five characteristics of modified wood.

The first is the stability of color and size: the modified wood is often darker in color, with clearer wood grain than normal; the shrinkage of wood is significantly reduced, sometimes up to 40-50% compared to natural wood.

The second is that modified wood has a lower thermal conductivity of 20-25% compared to normal wood. This characteristic helps improve the insulation performance of wood materials. Modified wood will help users feel cooler and more comfortable. Moreover, it is safer and more fireproof.

The third is that the moisture absorption is lower than natural wood. This helps keep the wood dry, avoiding moisture that causes wood rot, termites and prevents the growth of mold that destroys wood.

The fourth is that the hardness of modified wood is higher than that of natural wood, and finally, modified wood has high biological durability because the nutritional components have been removed and the original structure of the wood has been changed.

There are many types of modified wood used, but the most popular are modified pine and modified ash. These two types bring high applicability and durability. They are used for flooring, wall cladding, swimming pools, garden paths or you can see them in wooden walls with natural brown color, beautiful, luxurious and friendly.

The traditional wood modification technology mainly comprises other wood modification methods such as wood plastic combination, wood impregnation, wood heat treatment, wood acetylation and the like. Among the above methods, the impregnation method is the most common method in the wood modification process, and the method is mainly used for effectively introducing impregnation liquid into the wood under the action of pressure so as to improve the performance of the wood. The most common impregnation substances for strengthening wood by an impregnation method are mainly resins, and commonly used resins include phenolic resins, urea-formaldehyde resins, sugar alcohol resins, resorcinol resins and the like. However, these resins are organic and are prone to aging, which adversely affects the volume stability of the wood.

According to patent application No. JP5729718B2 published in 2010, the invention refers to use of hydrophilic membranes such as NaCMC or Sodium polyacrylate, alkalized to form a membrane, then painted with PU. Fireproof wood products obtained from this process are at risk of when cracking the PU paint, water will be seeping into wood products to lose fireproof salt. Therefore, the product requires regular maintenance, and the cost is high.

U.S. patent Ser. No. 11/807,782B2 published in 2021, the invention refers to waterproofing by impregnating fire-resistant salts with PVAc, repeating waterproofing with hydrophilic (PVAc) or hydrophobic membranes, including lacquer, alkyd or other synthetic polymer membranes. However, this solution does not disclose the processing step to increase fire resistance.

The invention aims to solve the technical problem of the prior art and provides a modified wood and a preparation method thereof, and the method can mineralize wood, improve the density and the dimensional stability of the wood and optimize the mechanical property of the wood.

The objective of the present invention is to provide a novel, cost-efficient and simple industrial modification process of wood mineralization to produce mineralized wood material with improved properties, in particular an improved water resistance and flame retardancy.

Another object of the invention is further to provide novel, modified wood materials with improved properties, in particular an improved water resistance and flame retardancy.

This invention provides solutions to achieve the above goals.

SUMMARY OF THE INVENTION

Accordingly, a first objective of the present invention is to provide a method for the modification of wood materials to improve mechanical properties, water resistance and flame retardancy by utilizing a combination of mineralization with infusion and polymerization of biopolymers comprising steps performed in the following specific order:
  (i) preparing and pre-treating wood materials comprising the following steps:
    (a) sawing wood materials into wood boards with a maximum thickness of 6 cm;
    (b) soaking the wood boards in 0.5%-1.5% $Ca(OH)_2$ solution at a ratio of 1:2 (w/v) for 12-72 hours; and
    (c) washing the treated wood boards at step (b) with water, and drying to a moisture content below 20% to obtain a pre-treated wood board;
  (ii) hardening the pre-treated wood boards via the creation and deposition of mineral crystal or metal oxide inside the wood fiber by performing steps (a1) to (a2):
    (a1) adding the pre-treated wood boards into an immersion equipment setting a negative pressure of $-0.5$ to $-1$ bar maintained for 30-90 minutes, then adding a first salt solution into equipment at a ratio of 1:2 (w/v) for immersing the pre-treated wood boards with pH 2-4, at 40° C.-50° C. for 30-45 minutes, then reducing temperature to 25° C.-30° C. for 0.5-3 hours, in which adjusting a minimum pressure differential during the immersing of 0.5 bar, and gradually reducing to 0 bar for ending of immersing;
wherein the first salt solution has a concentration of 10%-20%;
the first salt solution includes sodium carboxymethyl cellulose (NaCMC) component or carboxymethyl cellulose (CMC) component, a first salt mixture, and the rest is water;
in which a ratio between sodium carboxymethyl cellulose (NaCMC) component or carboxymethyl cellulose (CMC) component and the first salt mixture by mass is 1:(25-75);
the first salt mixture includes a monovalent or multivalent anionic moiety creating mineral crystal, and a monovalent cation moiety;
the monovalent cation is selected from the group consisting of Na+, $NH_4^+$, and combinations thereof;
the monovalent or multivalent anionic moiety creating mineral crystal is selected from the group consisting of $HCO_3^-$, $CO_3^{2-}$, $PO_4^{3-}$, $HPO_4^{2-}$, $H_2PO_4^-$, $SiO_3^{2-}$, $SO_4^{2-}$, $B_4O_7^{2-}$, and combinations thereof;
(a2) adding the treated wood boards at step (a1) into another immersion equipment setting a negative pressure of −0.5 to −1.0 bar maintained for 60-120 minutes, then adding a second salt solution into equipment at a ratio of 1:2 (w/v) for immersing the wood boards for 1-3 hours, in which adjusting the minimum pressure differential during the immersing of 0.5 bar, and gradually reducing to 0 bar for ending of immersing;
wherein the second salt solution has a concentration of 10%-20%;
the second salt solution includes a second salt mixture and the rest is water, in which the second salt solution is obtained by homogeneously dissolving the second salt mixture with a molar mass of 5-10 mol with 5 liters of water;
the second salt mixture includes a divalent metal cation moiety creating mineral crystal, and a monovalent or multivalent anionic moiety;
the divalent metal cation moiety creating mineral crystal is selected from the group consisting of $Mg^{2+}$, $Ca^{2+}$, $Cu^{2+}$, and combinations thereof;
the monovalent or multivalent anionic moiety is selected from the group consisting of $Cl^-$, $NO_3^-$, an anion of formic acid ($HCOO^-$), an anion of acetic acid ($CH_3COO-$), an anion of citric acid ($C_3H_5O(COO)_3^{3-}$), and combinations thereof; and
(iii) washing the treated wood boards at step (ii) with water, and drying to a moisture content below 20%;
(iv) treating the wood for flame resistance by adding the treated wood boards at step (iii) into another immersion equipment setting a negative pressure of −0.5 to −1.0 bar maintained for 90-150 minutes, then adding a third salt solution into equipment at a ratio of 1:2 (w/v) for immersing the wood boards for 1-3 hours, in which adjusting the minimum pressure differential during the immersing of 0.5 bar, and gradually reducing to 0 bar for ending of immersing;
wherein the third salt solution has a concentration of 20%-40%;
the third salt solution includes a third salt mixture and the rest is water;

the third salt mixture includes a monovalent or multivalent anionic moiety, and a monovalent cation moiety;
the monovalent cation moiety is selected from the group consisting of Na+, $NH_4^+$, and combinations thereof; and
the monovalent or multivalent anionic moiety is selected from the group consisting of $PO_4^{3-}$, $HPO_4^{2-}$, $H_2PO_4^-$, $SiO_3^{2-}$, $SO_4^{2-}$, $B_4O_7^{2-}$, and combinations thereof;
(v) treating the wood for water resistance by immersing the treated wood board at step
(iv) in a colloidal system at a ratio of 1:2 (v/v) at 70° C. for 1-3 hours;
wherein the colloidal system has a concentration of 0.2%-2%; and
the colloidal system is selected from the group consisting of pectin, chitosan, lignin, and combinations thereof;
in which the combination of colloidal system is chitosan and lignin;
(vi) adding the treated wood boards at step (v) into another immersion equipment setting the negative pressure of −0.5 to −1.0 bar maintained for 120-180 minutes, then adding a fourth salt solution into equipment at a ratio of 1:2 (w/v) for immersing the wood boards at 70° C.-90° C. for 30-60 minutes, then reducing temperature to 30° C.-35° C. for 3-4 hours, in which adjusting a minimum pressure differential during the immersing of 0.5 bar, and gradually reducing to 0 bar for ending of immersing;
wherein the fourth salt solution has a concentration of 10%-20%, in which the fourth salt solution includes sodium carboxymethyl cellulose (NaCMC) component or carboxymethyl cellulose (CMC) component, the second salt mixture, and the rest is water;
in which a ratio between sodium carboxymethyl cellulose (NaCMC) component or carboxymethyl cellulose (CMC) component and the second salt mixture by mass is 1:(25-75);
the second salt mixture includes the divalent metal cation moiety creating mineral crystal, and the monovalent or multivalent anionic moiety;
the divalent metal cation moiety creating mineral crystal is selected from the group consisting of $Mg^{2+}$, $Ca^{2+}$, $Cu^{2+}$, and combinations thereof;
the monovalent or multivalent anionic moiety is selected from the group consisting of $Cl^-$, $NO^{3-}$, an anion of formic acid ($HCOO^-$), an anion of acetic acid ($CH_3COO-$), an anion of citric acid ($C_3H_5O(COO)_3^{3-}$), and combinations thereof; and
(vii) drying the treated wood boards at step (vi) to a moisture content of 10%±2% to obtain a modified wood.

A second objective of the present invention is to provide a method for the modification of wood materials to improve mechanical properties, water resistance and flame retardancy by utilizing a combination of mineralization with infusion and polymerization of biopolymers comprising steps performed in the following specific order:
(i') preparing and pre-treating wood materials comprising the following steps:
(a') sawing wood materials into wood boards with a maximum thickness of 6 cm;
(b') soaking the wood boards in 0.5%-1.5% $Ca(OH)_2$ solution at a ratio of 1:2 (w/v) for 12-72 hours; and (c') washing the treated wood boards at step (b') with water, and drying to a moisture content below 20% to obtain a pre-treated wood board;

(ii') hardening the pre-treated wood boards via the creation and deposition of mineral crystal or metal oxide inside the wood fiber by performing steps (a1') to (a2'):

(a1') adding the pre-treated wood boards into an immersion equipment setting a negative pressure of −0.5 to −1 bar maintained for 30-90 minutes, then adding a first salt solution into equipment at a ratio of 1:2 (w/v) for immersing the pre-treated wood boards with pH 2-4, at 40° C.-50° C. for 30-45 minutes, then reducing temperature to 25° C.-30° C. for 0.5-3 hours, in which adjusting a minimum pressure differential during the immersing of 0.5 bar, and gradually reducing to 0 bar for ending of immersing;

wherein the first salt solution has a concentration of 10%-20%;

the first salt solution includes sodium carboxymethyl cellulose (NaCMC) component or carboxymethyl cellulose (CMC) component, a first salt mixture, and the rest is water;

in which a ratio between sodium carboxymethyl cellulose (NaCMC) component or carboxymethyl cellulose (CMC) component and the first salt mixture by mass is 1:(25-75);

the first salt mixture includes a monovalent or multivalent anionic moiety creating mineral crystal, and a monovalent cation moiety;

the monovalent cation is selected from the group consisting of $Na^+$, $NH_{4+}$, and combinations thereof;

the monovalent or multivalent anionic moiety creating mineral crystal is selected from the group consisting of $HCO_3^-$, $CO_3^{2-}$, $PO_4^{3-}$, $HPO_4^{2-}$, $H_2PO_4^-$, $SiO_3^{2-}$, $SO_4^{2-}$, $B_4O_7^{2-}$, and combinations thereof;

(a2') adding the treated wood boards at step (a1) into another immersion equipment setting a negative pressure of −0.5 to −1.0 bar maintained for 60-120 minutes, then adding a second salt solution into equipment at a ratio of 1:2 (w/v) for immersing the wood boards for 1-3 hours, in which adjusting the minimum pressure differential during the immersing of 0.5 bar, and gradually reducing to 0 bar for ending of immersing;

wherein the second salt solution has a concentration of 10%-20%;

the second salt solution includes a second salt mixture and the rest is water, in which the second salt solution is obtained by homogeneously dissolving the second salt mixture with a molar mass of 5-10 mol with 5 liters of water;

the second salt mixture includes a divalent metal cation moiety creating mineral crystal, and a monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO^{3-}$, an anion of formic acid ($HCOO^-$), an anion of acetic acid ($CH_3COO-$), an anion of citric acid ($C_3H_5O(COO)_3^{3-}$), and combinations thereof; and (iii') washing the treated wood boards at step (ii') with water, and drying to a moisture content below 20%;

(iv') treating the wood for water resistance and flame resistance by adding the treated wood boards at step (iii') into another immersion equipment setting a negative pressure of −0.5 to −1.0 bar maintained for 90-150 minutes, then adding a third salt solution and a colloidal system into equipment at a ratio of 1:2:2 (w/v/v) for immersing the wood boards for 1-3 hours, in which adjusting the minimum pressure differential during the immersing of 0.5 bar, and gradually reducing to 0 bar for ending of immersing;

wherein the third salt solution has a concentration of 20%-40%;

the colloidal system has a concentration of 0.2%-2%, in which the colloidal system is chitosan or chitosan and lignin;

the third salt solution includes a third salt mixture and the rest is water, wherein the third salt mixture includes a monovalent or multivalent anionic moiety, and a monovalent cation moiety;

the monovalent cation moiety is selected from the group consisting of $Na^+$, $NH_4^+$, and combinations thereof; and the monovalent or multivalent anionic moiety is selected from the group consisting of $PO_4^{3-}$, $HPO_4^{2-}$, $H_2PO_4^-$, $SiO_3^{2-}$, $SO_4^{2-}$, $B_4O_7^{2-}$, and combinations thereof;

(v') adding the treated wood boards at step (iv') into another immersion equipment setting the negative pressure of −0.5 to −1.0 bar maintained for 120-180 minutes, then adding a fourth salt solution into equipment at a ratio of 1:2 (w/v) for immersing the wood boards at 70° C.-90° C. for 30-60 minutes, then reducing temperature to 30° C.-35° C. for 3-4 hours, in which adjusting a minimum pressure differential during the immersing of 0.5 bar, and gradually reducing to 0 bar for ending of immersing;

wherein the fourth salt solution has a concentration of 10%-20%, in which the fourth salt solution includes sodium carboxymethyl cellulose (NaCMC) component or carboxymethyl cellulose (CMC) component, the second salt mixture, and the rest is water;

in which a ratio between sodium carboxymethyl cellulose (NaCMC) component or carboxymethyl cellulose (CMC) component and the second salt mixture by mass is 1:(25-75);

the second salt mixture includes the divalent metal cation moiety creating mineral crystal, and the monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO^{3-}$, an anion of formic acid ($HCOO^-$), an anion of acetic acid ($CH_3COO-$), an anion of citric acid ($C_3H_5O(COO)_3^{3-}$), and combinations thereof; and (vi') drying the treated wood boards at step (v') to a moisture content of 10%±2% to obtain a modified wood.

In view of the foregoing, another objective of the present invention is to provide a modified wood after being treated according to the first and second objective of the present invention has the hardness comparable to other types of hardwood, environmentally friendly, to super E0 standards, suitable for purposes both out and indoor.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWING

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with these preferred embodiments, it should be understood that they are not intended to limit the invention. On the contrary, the invention is intended to cover alternatives, modifications, and equivalents that may be included within the spirit and scope of the invention as defined by the appended claims.

Furthermore, in the following detailed description of the present invention, numerous specific details are set fourth to provide a thorough understanding. However, it will be obvious to one of ordinary skills in the art that the present invention may be practiced without these specific details. In other instances, well-known methods, procedures, components, and circuits have not been described in detail so as not to unnecessarily obscure aspects of the present invention.

It should be noted that the terms "comprises" and "comprising", as well as "the" and "these", are intended to cover a non-exclusive inclusion. For example, a process, method, system, product, or device that comprises a series of steps or units is not necessarily limited to those explicitly listed and may include other steps or units not explicitly mentioned or inherent to such processes, methods, products, or devices.

In the following, to facilitate the understanding of the present solution, some proper nouns appearing in the subsequent embodiments of the present application are explained.

In the embodiment of the present invention, percent mass or percentage (%) by weight=(mass of solute/mass of solution)×100%. The unit of mass is usually grams, or kilograms. Mass percent is also known as the correct percentage by weight or w/w %. It should also be noted that the molar mass is also within the meaning of the invention. Molar mass is the total mass of all atoms in a mole of compound. Total all volume percentages add up to 100%.

Figure 1:
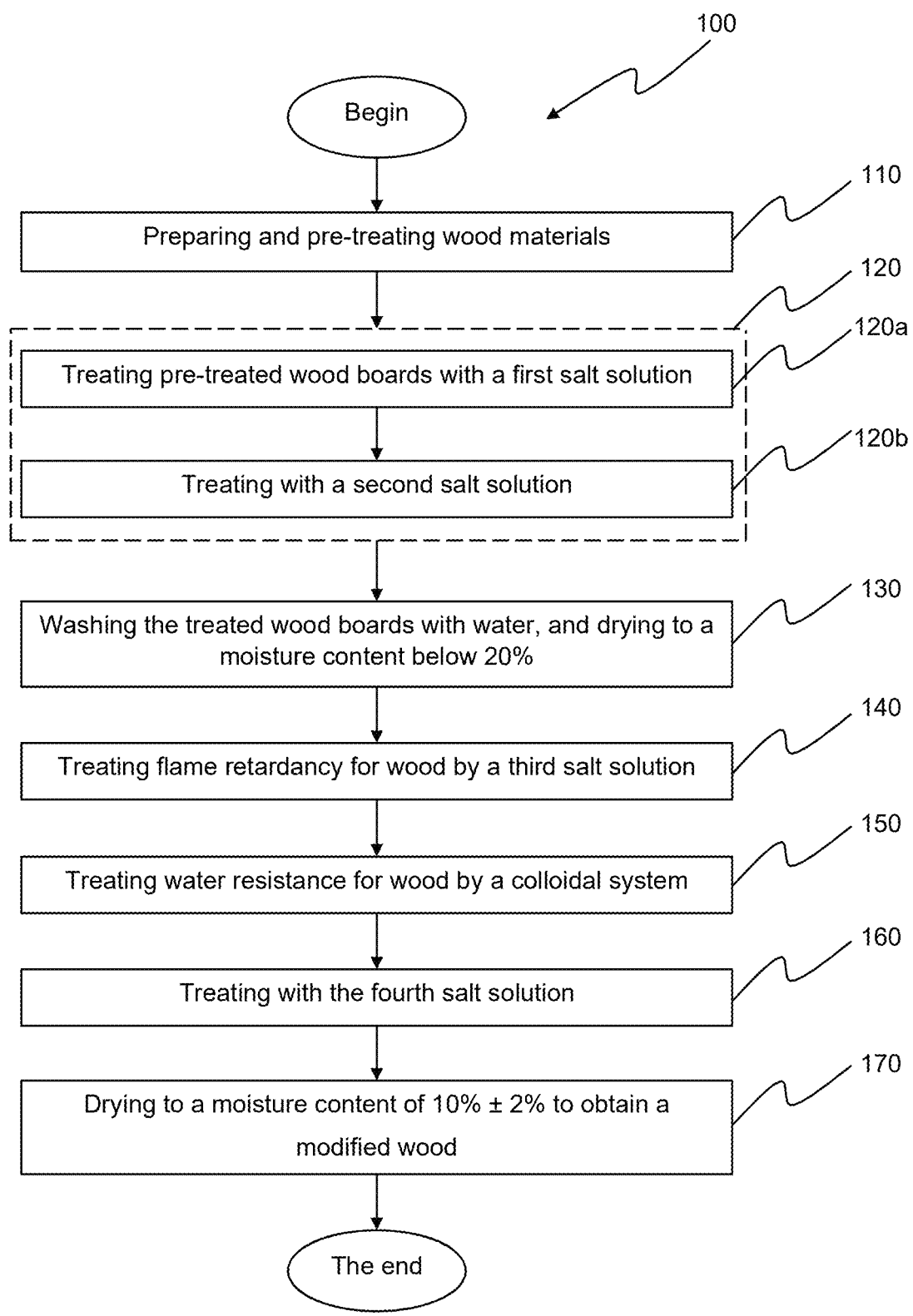
FIG. 1 is a flowchart illustrating the first principle of a method for the modification of wood materials to improve mechanical properties, water resistance and flame retardancy by utilizing a combination of mineralization with infusion and polymerization of biopolymers in accordance with an exemplary embodiment of the present invention.

Now referring to FIG. 1, is a flowchart illustrating the first principle of a for method for the modification of wood materials to improve mechanical properties, water resistance and flame retardancy by utilizing a combination of mineralization with infusion and polymerization of biopolymers 100 ("method 100") according to the embodiment of the present invention. In particular, method 100 includes the following steps:

At step 110, preparing and pre-treating wood materials comprising:
(a) sawing wood materials into wood boards with a maximum thickness of 6 cm;
(b) soaking the wood boards in 0.5%-1.5% $Ca(OH)_2$ solution at a ratio of 1:2 (w/v) for 12-72 hours; and
(c) washing the treated wood boards at step (b) with water, and drying to a moisture content below 20% to obtain a pre-treated wood board.

According to the embodiment of the invention, the wood materials include softwood, and sapwood.

In the context of the present invention, the term "softwood" relates to wood of conifers and/or broadleaf. The conifers and/or broadleaf may be non-modified or genetically modified. In some embodiments, the softwood can be a naturally occurring fibrous plant other than a tree, such as bamboo. In one embodiment, the softwood materials is selected from the group consisting of pinaceae, pinus, lauraceae, cinnamomum, meliaceae, fabaceea, acacia, acacieae, mimosoideae, pithecellobium, ingeae, delonix, caesalpinioideae, caesalpinioideae, euphorbiaceae, cassieae, caesalpinioideae, myrtaceae, and hervea. In the other preferred embodiment, the softwood materials is selected from the group consisting of, but not limited to, pine, American pine, yellow pine, white pine, yellow poplar, tamarind, acacia, cajuput, cinnamon, rubber, eucalyptus, ash, oak, red oak, black walnut, teak, American cherry, and cedar. In a more preferred embodiment, the softwood materials is selected from the group consisting of American pine (*Pinus strobus, Pinus albicaulis*), Brazilian pine (*Araucaria angustifolia, Pinus taeda*), Argentia pine (*Araucaria araucana, Pinus radiata*), horsetail pine (*Pinus massoniana*), Hinoki pine (*Chamaecyparis obtusa*), and cinnamon (*Cinnamomum cassia* (L.) J. Presl, *Cinnamomum loureiroi* Nees, *Cinnamomum verum* J. Presl), bead tree (*Melia azedarach*), sapele (*Prunus arborea*), and neem (*Azadirachta indica*).

According to the embodiment of the invention, the wood boards are 2-4 cm thick preferably.

At step 120, hardening the pre-treated wood boards at step 110 via the creation and deposition of mineral crystal or metal oxide inside the wood fiber, in which step 120 including sub-step 120*a* immersing the pre-treated wood boards in a first salt solution, and sub-step 120*b* immersing the treated wood boards at sub-step 120*a* in a second salt solution.

At sub-step 120*a*, treating with first salt solution by adding the pre-treated wood boards at step 110 into an immersion equipment setting a negative pressure of −0.5 to −1 bar maintained for 30-90 minutes, then adding the first salt solution into equipment at a ratio of 1:2 (w/v) for immersing the pre-treated wood boards with pH 2 to 4, at 40° C.-50° C. for 30-45 minutes, then reducing temperature to 25° C.-30° C. for 0.5-3 hours, in which adjusting a minimum pressure differential during the immersing of 0.5 bar, and gradually reducing to 0 bar for ending of immersing.

According to the embodiment of the invention, the first salt solution has a concentration of 10%-20%, in which the first salt solution includes sodium carboxymethyl cellulose (NaCMC) component or carboxymethyl cellulose (CMC) component, a first salt mixture, and the rest is water;

wherein a ratio between sodium carboxymethyl cellulose (NaCMC) component or carboxymethyl cellulose (CMC) component and the first salt mixture by mass is 1:(25-75);

wherein the first salt mixture includes a monovalent or multivalent anionic moiety creating mineral crystal, and a monovalent cation moiety;

the monovalent cation is selected from the group consisting of $Na^+$, $NH_4^+$, and combinations thereof;

the monovalent or multivalent anionic moiety creating mineral crystal is selected from the group consisting of $HCO_3^-$, $CO_3^{2-}$, $PO_4^{3-}$, $HPO_4^{2-}$, $H_2PO_4$, $SiO_3^{2-}$, $SO_4^{2-}$, $B_4O_7^{2-}$, $CH_3COO^-$ and combinations thereof.

According to the embodiment of the invention, the NaCMC component or CMC component has a concentration of 0.2%-0.5%.

In one embodiment, the first salt mixture is selected from the group consisting of:

group A1: the first salt mixture includes the monovalent cation $NH_4^+$, and the monovalent or multivalent anionic moiety creating mineral crystal combined from $CO_3^{2-}$, $SO_4^{2-}$, $PO_4^{3-}$, $HCO_3^+$, $HPO_4^{2-}$, and $H_2PO_4^-$;

group B1: the first salt mixture includes the monovalent cation combined from $NH_4^+$ and $Na^+$, and the monovalent or multivalent anionic moiety creating mineral crystal combined from $CO_3^{2-}$, $SO_4^{2-}$, $PO_4^{3-}$, $B_4O_7^{2-}$, $HCO_3^-$, $HPO_4^{2-}$, and $H_2PO_4^-$; and group C1: the first salt mixture includes the monovalent cation $Na^+$, and the monovalent or multivalent anionic moiety creating mineral crystal combined from $CO_3^{2-}$, $SO_4^{2-}$, $PO_4^{3-}$, $B_4O_7^{2-}$, $SiO_3^{2-}$, $HCO_3^-$, $HPO_4^{2-}$, and $H_2PO_4^-$.

At sub-step 120b, treating with first salt solution by immersing the treated wood boards at sub-step 120a in the second salt solution at a ratio of 1:2 (v/v) at 70° C. for 1-3 hours, with a negative pressure of −0.5 to −1.0 bar maintained for at least 60 minutes and a rest of 30 minutes, and a minimum pressure difference of 0.5 bar.

According to the embodiment of the invention, maintained the negative pressure is 60-180 minutes, preferably 60-120 minutes.

According to the embodiment of the invention, the second salt solution has a concentration of 10%-20%, in which the second salt solution includes a second salt mixture and the rest is water.

According to the embodiment of the invention, the second salt solution is obtained by homogeneously dissolving the second salt mixture with a molar mass of 5-10 mol with 5 liters of water;

wherein the second salt mixture includes a divalent metal cation moiety creating mineral crystal, and a monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO^{3-}$, an anion of formic acid ($HCOO^-$), an anion of acetic acid ($CH_3COO—$), an anion of citric acid ($C_3H_5O(COO)_3^{3-}$), and combinations thereof.

In one embodiment, the second salt solution has a concentration of 12%-15%, in which the second salt solution contains the second salt mixture which is a simple salt including $MgCl_2$, $Mg(NO_3)_2$, $(HCOO)_2Mg$, $(CH_3COO)_2Mg$, $(C_3H_5O(COO)_3)_2Mg$, $CaCl_2$), $Ca(NO_3)_2$, $(HCOO)_2Ca$, $(CH_3COO)_2Ca$, $(C_3H_5O(COO)_3)_2Ca$, $CaCl_2$, $Cu(NO_3)_2$, and $(CH_3COO)_2Cu$.

In the other embodiment, the second salt mixture is selected from the group consisting of:

group A2: the second salt mixture includes the divalent metal cation moiety creating mineral crystal $Ca^{2+}$, and the monovalent or multivalent anionic moiety combined from $Cl^-$, $NO_3^-$, $HCOO^-$, $CH_3COO^-$, and $C_3H_5O(COO)_3^{3-}$;

group B2: the second salt mixture includes the divalent metal cation moiety creating mineral crystal combined from $Ca^{2+}$ and $Cu^{2+}$, and the monovalent or multivalent anionic moiety combined from $Cl^-$, $NO_3^-$, $HCOO^-$, $CH_3COO^-$, and $C_3H_5O(COO)_3^{3-}$;

group C2: the second salt mixture includes the divalent metal cation moiety creating mineral crystal combined from $Ca^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$;

group D2: the second salt mixture includes the divalent metal cation moiety creating mineral crystal combined from $Cu^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$; and group E2: the second salt mixture includes the divalent metal cation moiety creating mineral crystal combined from $Ca^{2+}$, $Cu^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$.

According to the embodiment of the invention, repeating step 120 up to three times.

In a preferred embodiment, repeating step 120 once for ash wood (*Fraxinus chinensis* Roxb.).

In a more preferred embodiment, repeating step 120 twice for American pine (*Pinus strobus, Pinus albicaulis*).

According to the other embodiment of the invention, step 120 can do step 120b before doing step 120a.

At step 130, washing the treated wood boards at step 120 with water, then drying to a moisture content below 20%.

At step 140, treating the wood for flame resistance by adding the treated wood boards at step 130 into another immersion equipment setting a negative pressure of −0.5 to −1.0 bar maintained for 90-150 minutes, then adding a third salt solution into equipment at a ratio of 1:2 (w/v) for immersing the wood boards for 1-3 hours, in which adjusting the minimum pressure differential during the immersing of 0.5 bar, and gradually reducing to 0 bar for ending of immersing.

According to the embodiment of the present invention, the third salt solution has a concentration of 20%-40%, in which the third salt solution includes a third salt mixture and the rest is water.

In one embodiment, the third salt mixture includes a monovalent or multivalent anionic moiety, and a monovalent cation moiety;

wherein the monovalent cation moiety is selected from the group consisting of $Na^+$, $NH_{4+}$, and combinations thereof; and wherein the monovalent or multivalent anionic moiety is selected from the group consisting of $PO_4^{3-}$, $HPO_4^{2-}$, $H_2PO_4^-$, $SiO_3^{2-}$, $SO_4^{2-}$, $B_4O_7^{2-}$—, and combinations thereof.

In one another embodiment, the third salt mixture is selected from the group consisting of:

group A3: the third salt mixture include the monovalent cation $NH_{4+}$, and the monovalent or multivalent anionic moiety combined from $SO_4^{2-}$, $PO_4^{3-}$, $HPO_4^{2-}$, and $H_2PO_4^-$;

group B3: the third salt mixture include the monovalent cation combined from $NH_{4+}$ and $Na^+$, and the monovalent or multivalent anionic moiety combined from $SO_4^{2-}$, $PO_4^{3-}$, $B_4O_7^{2-}$, $HPO_4^{2-}$, and $H_2PO_4^-$; and group C3: the monovalent cation $Na^+$, and the monovalent or multivalent anionic moiety combined from $SiO_3^{2-}$, $B_4O_7^{2-}$, $PO_4^{3-}$, $HPO_4^{2-}$, and $H_2PO_4^-$.

At step 150, treating the wood for water resistance by immersing the treated wood board at step 140 in a colloidal system at a ratio of 1:2 (v/v) at 70° C. for 1-3 hours.

According to the embodiment of the present invention, the colloidal system has a concentration of 0.2%-2%, in which the colloidal system is selected from the group consisting of pectin, chitosan, lignin, and combinations thereof.

According to the embodiment of the present invention, the combination of colloidal system is chitosan and lignin.

At step 160, adding the treated wood boards at step 150 into another immersion equipment setting the negative pressure of −0.5 to −1.0 bar maintained for 120-180 minutes, then adding a fourth salt solution into equipment at a ratio of 1:2 (w/v) for immersing the wood boards at 70° C.-90° C. for 30-60 minutes, then reducing temperature to 30° C.-35° C. for 3-4 hours, in which adjusting a minimum pressure differential during the immersing of 0.5 bar, and gradually reducing to 0 bar for ending of immersing.

According to the embodiment of the present invention, the fourth salt solution includes sodium carboxymethyl cellulose (NaCMC) component or carboxymethyl cellulose (CMC) component, the second salt mixture, and the rest is water; wherein the fourth salt solution has a concentration of 10%-20%;

in which a ratio between sodium carboxymethyl cellulose (NaCMC) component or carboxymethyl cellulose (CMC) component and the second salt mixture by mass is 1:(25:75);

the second salt mixture includes the divalent metal cation moiety creating mineral crystal, and the monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO^{3-}$, an anion of formic acid ($HCOO^-$), an anion of acetic acid ($CH_3COO^-$), an anion of citric acid ($C_3H_5O(COO)_3^{3}$), and combinations thereof.

According to the embodiment of the present invention, the second salt mixture at step 160 includes the same technical properties described in sub-step 120b above.

Finally, at step 170, drying the treated wood boards at step 160 to a moisture content of 10%±2% to obtain a modified wood.

According to the preferred embodiment of the present invention, steps 120, 140 and 160 further comprises adjusting the pressure differential during the immersing in order −0.8 bar, −0.5 bar, −0.1 bar, 0.5 bar, and 0.8 bar.

Within the scope of the present invention, steps 120, 140, and 160 are performed by the immersion equipment. The immersion equipment has been known in previous art so the description of the structure and its operating principle will not be described in detail in the invention.

According to the embodiment of the present invention, the method 100 for the modification of American pine (*Pinus strobus, Pinus albicaulis*) to obtain the modified wood which 16%-25%±2% by weight heavier than the American pine boards pre-treated following step 110.

According to the other embodiment of the invention, the method 100 further comprising flocculation by immersing the treated wood boards at step 120 into a fifth salt solution, in which this flocculation is performed after step 120 and before step 130.

According to the embodiment of the present invention, flocculation by immersing the treated wood boards at step 120 into the fifth solution at a ratio of 1:2 (w/v) for 1-3 hours, wherein the fifth solution comprises a monovalent or multivalent anionic moiety, a trivalent metal cation moiety and the rest is water;

the trivalent metal cation is selected from the group consisting of $Al^{3+}$, $Fe^{3+}$, and combinations thereof; and the monovalent or multivalent anionic is selected from the group consisting of $Cl^-$, $SO_4^{2-}$, and combinations thereof.

Figure 2:
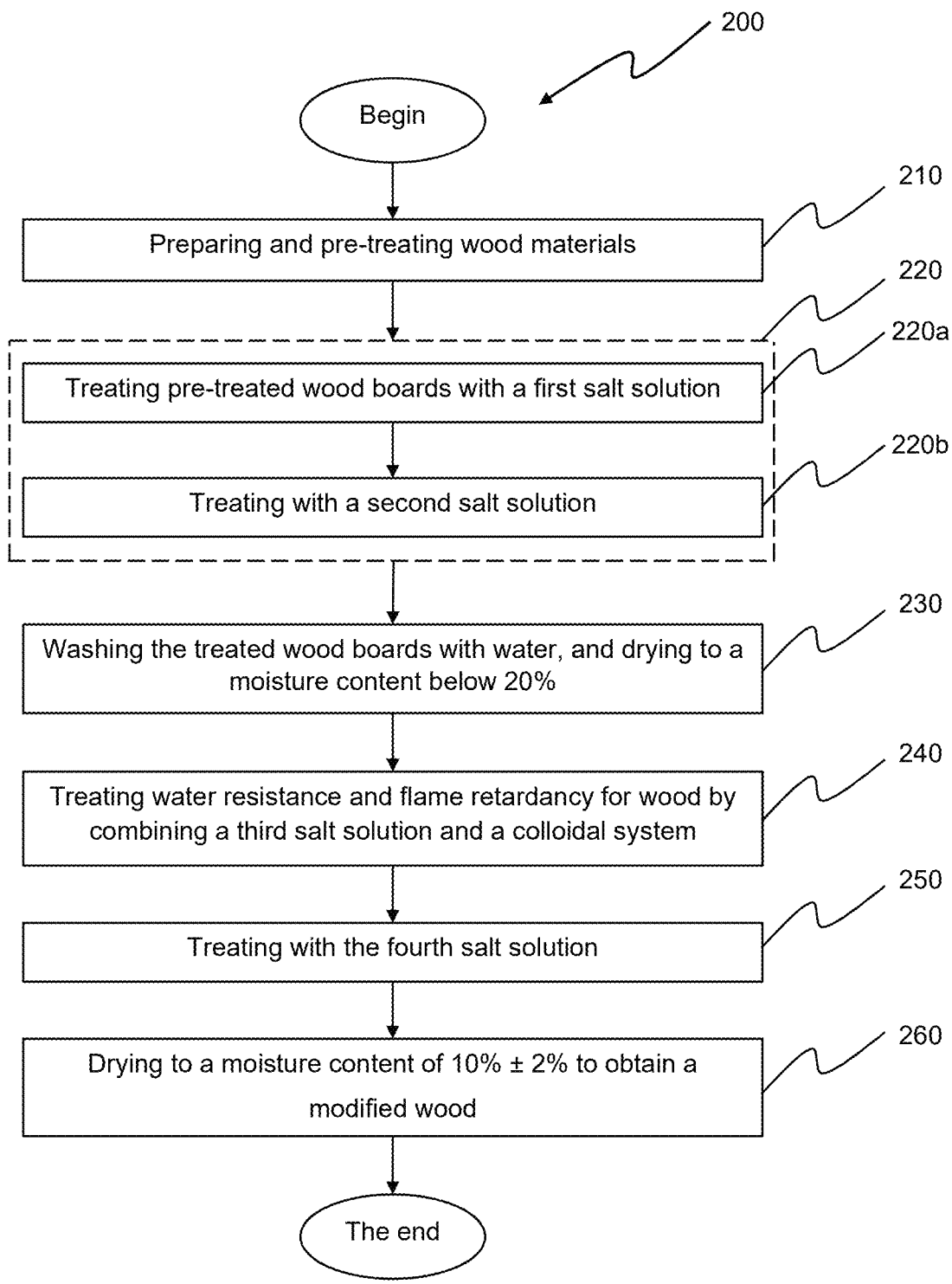
FIG. 2 is a flowchart illustrating the second principle of a method for the modification of wood materials to improve mechanical properties, water resistance and flame retardancy by utilizing a combination of mineralization with infusion and polymerization of biopolymers in accordance with an exemplary embodiment of the present invention.

Referring to FIG. 2, is a flowchart illustrating the second principle of a method for the modification of wood materials to improve mechanical properties, water resistance and flame retardancy by utilizing a combination of mineralization with infusion and polymerization of biopolymers 200 ("method 200") in accordance with an exemplary embodiment of the present invention. In particular, method 200 includes the following steps:

At step 210, preparing and pre-treating wood materials, in which step 210 is similar to step 110 in the method 100 described above.

According to the embodiment of the invention, the wood materials include softwood, and sapwood.

According to the embodiment of the invention, the softwood materials include pine, American pine, yellow pine, white pine, yellow poplar, tamarind, acacia, cajuput, cinnamon, rubber, eucalyptus, ash, oak, red oak, black walnut, teak, American cherry, cedar, bead tree, sapele, and neem.

According to the embodiment of the invention, the wood boards are 2-4 cm thick preferably.

At step 220, hardening the pre-treated wood boards at step 220 via the creation and deposition of mineral crystal or metal oxide inside the wood fiber, in which step 220 is similar to step 120 in the method 100 described above.

Step 220 including sub-step 220a immersing the pre-treated wood boards in the first salt solution, and sub-step 220b immersing the treated wood boards at sub-step 220a in the second salt solution;

wherein sub-step 220a is similar to sub-step 120a in the method 100 described above; and wherein sub-step 220b is similar to sub-step 120b in the method 100 described above.

According to the embodiment of the invention, the first salt solution has a concentration of 10%-20%, in which the first salt solution includes sodium carboxymethyl cellulose (NaCMC) component or carboxymethyl cellulose (CMC) component, a first salt mixture, and the rest is water;

wherein a ratio between sodium carboxymethyl cellulose (NaCMC) component or carboxymethyl cellulose (CMC) component and the first salt mixture by mass is 1:(25-75);

wherein the first salt mixture includes a monovalent or multivalent anionic moiety creating mineral crystal, and a monovalent cation moiety;

the monovalent cation is selected from the group consisting of $Na^+$, $NH_{4+}$, and combinations thereof;

the monovalent or multivalent anionic moiety creating mineral crystal is selected from the group consisting of $HCO_3$, $CO_3^{2-}$, $PO_4^{3-}$, $HPO_4^{2-}$, $H_2PO_4$, $SiO_3^{2-}$, $SO_4^{2-}$, $B_4O_7^{2-}$, and combinations thereof.

In one another embodiment, the first salt mixture is selected from the group consisting of:

group A1: the first salt mixture includes the monovalent cation $NH_{4+}$, and the monovalent or multivalent anionic moiety creating mineral crystal combined from $CO_3^{2-}$, $SO_4^{2-}$, $PO_4^{3-}$, $HCO_{3+}$, $HPO_4^{2-}$, and $H_2PO_4^-$;

group B1: the first salt mixture includes the monovalent cation combined from $NH_{4+}$ and $Na^+$, and the monovalent or multivalent anionic moiety creating mineral crystal combined from $CO_3^{2-}$, $SO_4^{2-}$, $PO_4^{3-}$, $B_4O_7^{2-}$, $HCO_3$, $HPO_4^{2-}$, and $H_2PO_4^-$; and group C1: the first salt mixture includes the monovalent cation $Na^+$, and the monovalent or multivalent anionic moiety creating mineral crystal combined from $CO_3^{2-}$, $SO_4^{2-}$, $PO_4^{3-}$, $B_4O_7^{2-}$, $SiO_3^{2-}$, $HCO_3$, $HPO_4^{2-}$, and $H_2PO_4^-$.

According to the embodiment of the invention, the second salt solution has a concentration of 10%-20%, in which the second salt solution includes a second salt mixture and the rest is water.

According to the embodiment of the invention, the second salt solution is obtained by homogeneously dissolving the second salt mixture with a molar mass of 5-10 mol with 5 liters of water;

wherein the second salt mixture includes a divalent metal cation moiety creating mineral crystal, and a monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO^{3-}$, an anion of formic acid ($HCOO^-$), an anion of acetic acid ($CH_3COO^-$), an anion of citric acid ($C_3H_5O(COO)_3^{3-}$), and combinations thereof.

In one embodiment, the second salt solution has a concentration of 12%-15%, in which the second salt solution contains the second salt mixture which is a simple salt including $MgCl_2$, $Mg(NO_3)_2$, $(HCOO)_2Mg$, $(CH_3COO)_2Mg$, $(C_3H_5O(COO)_3)_2Mg$, $CaCl_2$, $Ca(NO_3)_2$, $(HCOO)_2Ca$, $(CH_3COO)_2Ca$, $(C_3H_5O(COO)_3)_2Ca$, $CaCl_2$, $Cu(NO_3)_2$, and $(CH_3COO)_2Cu$.

In the other embodiment, the second salt mixture is selected from the group consisting of:

group A2: the second salt mixture includes the divalent metal cation moiety creating mineral crystal $Ca^{2+}$, and the monovalent or multivalent anionic moiety combined from $Cl^-$, $NO_3^-$, $HCOO^-$, $CH_3COO^-$, and $C_3H_5O(COO)_3^{3-}$;

group B2: the second salt mixture includes the divalent metal cation moiety creating mineral crystal combined from $Ca^{2+}$ and $Cu^{2+}$, and the monovalent or multivalent anionic moiety combined from $Cl^-$, $NO_3^-$, $HCOO^-$, $CH_3COO^-$, and $C_3H_5O(COO)_3^{3-}$;

group C2: the second salt mixture includes the divalent metal cation moiety creating mineral crystal combined from $Ca^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$;

group D2: the second salt mixture includes the divalent metal cation moiety creating mineral crystal combined from $Cu^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$; and group E2: the second salt mixture includes the divalent metal cation moiety creating mineral crystal combined from $Ca^{2+}$, $Cu^{2+}$ and $Mg^{2+}$, and the monovalent or multivalent anionic moiety combined from $Cl^-$, $NO_3^-$, $HCOO^-$, $CH_3COO^-$, and $C_3H_5O(COO)_3^{3-}$.

According to the embodiment of the invention, repeating step 220 up to three times.

In a preferred embodiment, repeating step 220 once for ash wood (*Fraxinus chinensis* Roxb.).

In a more preferred embodiment, repeating step 220 twice for American pine (*Pinus strobus, Pinus albicaulis*).

According to the other embodiment of the invention, step 220 can do step 220b before doing step 220a.

At step 230, washing the treated wood boards at step 220 with water, then drying to a moisture content below 20%, in which step 230 is similar to step 130 in the method 100 described above.

At step 240, treating the wood for water resistance and flame resistance by adding the treated wood boards at step 230 into another immersion equipment setting a negative pressure of −0.5 to −1.0 bar maintained for 90-150 minutes, then adding a third salt solution and a colloidal system into equipment at a ratio of 1:2:2 (w/v/v) for immersing the wood boards for 1-3 hours, in which adjusting the minimum pressure differential during the immersing of 0.5 bar, and gradually reducing to 0 bar for ending of immersing.

According to the embodiment of the present invention, the third salt solution has a concentration of 20%-40%, in which the third salt solution includes a third salt mixture and the rest is water.

In one another embodiment, the third salt mixture includes a monovalent or multivalent anionic moiety, and a monovalent cation moiety;

the monovalent cation moiety is selected from the group consisting of $Na^+$, $NH_{4+}$, and combinations thereof; and the monovalent or multivalent anionic moiety is selected from the group consisting of $PO_4^{3-}$, $HPO_4^{2-}$, $H_2PO_4^-$, $SiO_3^{2-}$, $SO_4^{2-}$, $B_4O_7^{2-}$—, and combinations thereof.

In one another embodiment, the third salt mixture is selected from the group consisting of:

group A3: the third salt mixture include the monovalent cation $NH_{4+}$, and the monovalent or multivalent anionic moiety combined from $SO_4^{2-}$, $PO_4^{3-}$, $HPO_4^{2-}$, and $H_2PO_4^-$;

group B3: the third salt mixture include the monovalent cation combined from $NH_{4+}$ and $Na^+$, and the monovalent or multivalent anionic moiety combined from $SO_4^{2-}$, $PO_4^{3-}$, $B_4O_7^2$, $HPO_4^{2-}$, and $H_2PO_4^-$; and group C3: the monovalent cation $Na^+$, and the monovalent or multivalent anionic moiety combined from $SiO_3^{2-}$, $B_4O_7^{2-}$, $PO_4^{3-}$, $HPO_4^{2-}$, and $H_2PO_4$.

According to the embodiment of the present invention, the colloidal system has a concentration of 0.2%-2%, in which the colloidal system is chitosan or chitosan and lignin.

At step 250, adding the treated wood boards at step 240 into another immersion equipment setting the negative pressure of −0.5 to −1.0 bar maintained for 120-180 minutes, then adding a fourth salt solution into equipment at a ratio of 1:2 (w/v) for immersing the wood boards at 70° C.-90° C. for 30-60 minutes, then reducing temperature to 30° C.-35° C. for 3-4 hours, in which adjusting a minimum pressure differential during the immersing of 0.5 bar, and gradually reducing to 0 bar for ending of immersing.

According to the embodiment of the present invention, the fourth salt solution includes sodium carboxymethyl cellulose (NaCMC) component or carboxymethyl cellulose (CMC) component, the second salt mixture, and the rest is water; wherein the fourth salt solution has a concentration of 10%-20%;
  in which a ratio between sodium carboxymethyl cellulose (NaCMC) component or carboxymethyl cellulose (CMC) component and the second salt mixture by mass is 1:(25:75);
  the second salt mixture includes the divalent metal cation moiety creating mineral crystal, and the monovalent or multivalent anionic moiety;
    the divalent metal cation moiety creating mineral crystal is selected from the group consisting of $Mg^{2+}$, $Ca^{2+}$, $Cu^{2+}$, and combinations thereof;
    the monovalent or multivalent anionic moiety is selected from the group consisting of $Cl^-$, $NO^{3-}$, an anion of formic acid ($HCOO^-$), an anion of acetic acid ($CH_3COO^-$), an anion of citric acid ($C_3H_5O(COO)_3^{3-}$), and combinations thereof.

According to the embodiment of the present invention, the second salt mixture at step 250 includes the same technical properties described in sub-step 220b above.

Finally, at step 260, drying the treated wood boards at step 250 to a moisture content of 10%±2% to obtain a modified wood.

According to the preferred embodiment of the present invention, steps 220, 240 and 250 further comprises adjusting the pressure differential during the immersing in order −0.8 bar, −0.5 bar, −0.1 bar, 0.5 bar, and 0.8 bar.

Within the scope of the present invention, steps 120, 140, and 160 are performed by the immersion equipment. The immersion equipment has been known in previous art so the description of the structure and its operating principle will not be described in detail in the invention.

According to the embodiment of the present invention, the method 200 for the modification of American pine (*Pinus strobus, Pinus albicaulis*) to obtain the modified wood which 16%-25%±2% by weight heavier than the American pine boards pre-treated following step 210.

According to the other embodiment of the invention, the method 200 further comprising flocculation by immersing the treated wood boards at step 220 into a fifth salt solution, in which this flocculation is performed after step 220 and before step 230.

According to the embodiment of the present invention, flocculation by immersing the treated wood boards at step 220 into the fifth solution at a ratio of 1:2 (w/v) for 1-3 hours, wherein the fifth solution comprises a monovalent or multivalent anionic moiety, a trivalent metal cation moiety and the rest is water;
  the trivalent metal cation is selected from the group consisting of $Al^{3+}$, $Fe^{3+}$, and combinations thereof; and
  the monovalent or multivalent anionic is selected from the group consisting of $Cl^-$, $SO_4^{2-}$, and combinations thereof.

Reference is now made to the following examples, which together with the above descriptions, illustrate the invention in non-limiting fashion.

Example 1: Preparing the modified ash wood by method 100, in which repeating step (120) once, including the following steps:
  (110) preparing:
    sawing ash woods into wood boards with thickness of 3 cm;
    soaking the wood boards into 1.5% $Ca(OH)_2$ solution at a ratio of 1:2 (w/v) for 12 hours; and
    washing the treated wood boards with water, and drying to a moisture content below 20% to obtain the pre-treated wood boards.
  (120) treating mechanically once:
    (120a) adding the pre-treated wood boards into an immersion equipment setting a negative pressure of −0.5 to −1 bar maintained for 30 minutes, then adding a first salt solution into equipment at a ratio of 1:2 (w/v) for immersing the pre-treated wood boards with pH 2 to 4, at 50° C. for 30 minutes, then reducing temperature to 25° C.-30° C. for 3 hours, in which adjusting a minimum pressure differential during the immersing of 0.5 bar, and gradually reducing to 0 bar for ending of immersing;
      wherein the first salt solution has a concentration of 12%, in which the first salt solution includes sodium carboxymethyl cellulose (NaCMC) component has a concentration of 0.5%, the first salt mixture, and the rest is water;
      the first salt mixture includes the monovalent cation combined from $NH_{4+}$ and $Na^+$, and the monovalent or multivalent anionic moiety creating mineral crystal combined from $CO_3^{2-}$, $SO_4^{2-}$, $PO_4^{3-}$, $B_4O_7^{2-}$, $HCO_3$, $HPO_4^{2-}$, and $H_2PO_4^-$;
      wherein adjusting the pressure differential during the immersing in order −0.8 bar, −0.5 bar, −0.1 bar, 0.5 bar, and 0.8 bar;
    (120b) adding the treated wood boards at step (120a) into another immersion equipment setting a negative pressure of −0.5 to −1.0 bar maintained for 60 minutes, then adding a second salt solution into equipment at a ratio of 1:2 (w/v) for immersing the wood boards for 3 hours, in which adjusting the minimum pressure differential during the immersing of 0.5 bar, and gradually reducing to 0 bar for ending of immersing;
      the second salt solution has a concentration of 10%-20%, in which the second salt solution includes $CaCl_2$ salt, and the rest is water;
      wherein adjusting the pressure differential during the immersing in order −0.8 bar, −0.5 bar, −0.1 bar, 0.5 bar, and 0.8 bar;
  (130) drying the treated wood board at step 120 to a moisture content below 20%;
  (140) treating the wood for flame resistance by adding the treated wood boards at step (130) into another immersion equipment setting a pressure of −0.5 to −1.0 bar maintained for 90 minutes, then adding a third salt solution into equipment at a ratio of 1:2 (w/v) for immersing the wood boards for 3 hours, in which adjusting the minimum pressure differential during the immersing of 0.5 bar, and gradually reducing to 0 bar for ending of immersing;
    the third salt solution has a concentration of 3M, in which the third salt solution includes a third salt mixture and the rest is water;
    the third salt mixture include the monovalent cation combined from $NH_{4+}$ and $Na^+$, and the monovalent or multivalent anionic moiety creating mineral crystal combined from $SO_4^{2-}$, $PO_4^{3-}$, $B_4O_7^{2-}$, $HPO_4^{2-}$, and $H_2PO_4^-$;
    wherein adjusting the pressure differential during the immersing in order 0.8 bar, 1.15 bar, 1.3 bar, and 1.5 atm;

(150) treating the wood for water resistance by immersing the treated wood board at step (140) in a colloidal system at a ratio of 1:2 (v/v) at 70° C. for 3 hours, in which the colloidal system is chitosan dissolved in aqueous acetic acid solution;
wherein the colloidal system has a concentration of 1.2%; and
(160) adding the treated wood boards at step (150) into another immersion equipment setting the negative pressure of −0.5 to −1.0 bar maintained for 120 minutes, then adding the fourth salt solution into equipment at a ratio of 1:2 (w/v) for immersing the wood boards at 80° C. for 60 minutes, then reducing temperature to 30° C.-35° C. for 3 hours, in which adjusting a minimum pressure differential during the immersing of 0.5 bar, and gradually reducing to 0 bar for ending of immersing;
wherein the fourth salt solution has a concentration of 12%, in which the fourth salt solution includes sodium carboxymethyl cellulose (NaCMC) component has a concentration of 0.5%, $CaCl_2$ salt, and the rest is water;
wherein adjusting the pressure differential during the immersing in order 0.8 bar, 1.15 bar, 1.3 bar, and 1.5 atm;
(170) drying the treated wood board at step (160) to a moisture content of 10%±2% to obtain the modified ash wood.

Example 2: Preparing the modified American pine wood by method 100, in which the modified American pine wood is prepared according to example 2 similar to example 1, but the difference is that step (120) is repeated twice. The modified American pine wood is 16%-25%±2% heavier than the pre-treated wood boards at step (110) by weight. Step (120) treating mechanically twice including:

A first time:
(120a) adding the pre-treated wood boards into an immersion equipment setting a negative pressure of −0.5 to −1 bar maintained for 30 minutes, then adding a first salt solution into equipment at a ratio of 1:2 (w/v) for immersing the pre-treated wood boards with pH 2 to 4, at 50° C. for 30 minutes, then reducing temperature to 25° C.-30° C. for 3 hours, in which adjusting a minimum pressure differential during the immersing of 0.5 bar, and gradually reducing to 0 bar for ending of immersing;
wherein the first salt solution has a concentration of 12%, in which the first salt solution includes sodium carboxymethyl cellulose (NaCMC) component has a concentration of 0.5%, the first salt mixture, and the rest is water;
the first salt mixture includes the monovalent cation combined from $NH_{4+}$ and $Na^+$, and the monovalent or multivalent anionic moiety creating mineral crystal combined from $CO_3^{2-}$, $SO_4^{2-}$, $PO_4^{3-}$, $B_4O_7^{2-}$, $HCO_3$, $HPO_4^{2-}$, and $H_2PO_4^-$;
wherein adjusting the pressure differential during the immersing in order −0.8 bar, −0.5 bar, −0.1 bar, 0.5 bar, and 0.8 bar;
(120b) adding the treated wood boards at step (120a) into another immersion equipment setting a negative pressure of −0.5 to −1.0 bar maintained for 60 minutes, then adding a second salt solution into equipment at a ratio of 1:2 (w/v) for immersing the wood boards for 3 hours, in which adjusting the minimum pressure differential during the immersing of 0.5 bar, and gradually reducing to 0 bar for ending of immersing;
the second salt solution has a concentration of 10%-20%, in which the second salt solution includes $CaCl_2$ salt, and the rest is water;
wherein adjusting the pressure differential during the immersing in order −0.8 bar, −0.5 bar, −0.1 bar, 0.5 bar, and 0.8 bar;

A second time:
(120a') adding the treated wood boards at step (120b) into an immersion equipment setting a negative pressure of −0.5 to −1 bar maintained for 90 minutes, then adding a first salt solution into equipment at a ratio of 1:2 (w/v) for immersing the pre-treated wood boards with pH 2 to 4, at 50° C. for 30 minutes, then reducing temperature to 25° C.-30° C. for 3 hours, in which adjusting a minimum pressure differential during the immersing of 0.5 bar, and gradually reducing to 0 bar for ending of immersing;
wherein the first salt solution has a concentration of 12%, in which the first salt solution includes sodium carboxymethyl cellulose (NaCMC) component has a concentration of 0.5%, the first salt mixture, and the rest is water;
the first salt mixture includes the monovalent cation combined from $NH_{4+}$ and $Na^+$, and the monovalent or multivalent anionic moiety creating mineral crystal combined from $CO_3^{2-}$, $SO_4^{2-}$, $PO_4^{3-}$, $B_4O_7^{2-}$, $HCO_3$, $HPO_4^{2-}$, and $H_2PO_4^-$;
wherein adjusting the pressure differential during the immersing in order −0.8 bar, −0.5 bar, −0.1 bar, 0.5 bar, and 0.8 bar;
(120b') adding the treated wood boards at step (120a') into another immersion equipment setting a negative pressure of −0.5 to −1.0 bar maintained for 120 minutes, then adding a second salt solution into equipment at a ratio of 1:2 (w/v) for immersing the wood boards for 3 hours, in which adjusting the minimum pressure differential during the immersing of 0.5 bar, and gradually reducing to 0 bar for ending of immersing;
the second salt solution has a concentration of 10%-20%, in which the second salt solution includes $CaCl_2$ salt, and the rest is water;
wherein adjusting the pressure differential during the immersing in order −0.8 bar, −0.5 bar, −0.1 bar, 0.5 bar, and 0.8 bar.

Example 3: Preparing the modified American pine wood by method 200, in which the modified American pine wood is prepared according to example 3 similar to example 2, but the difference is that steps (140) and (150) are performed at the same time, which is shown as follows:
treating the wood for water resistance and flame resistance by adding the treated wood boards at step (130) into another immersion equipment setting a negative pressure of −0.5 to −1.0 bar maintained for 90 minutes, then adding a third salt solution and a colloidal system into equipment at a ratio of 1:2:2 (w/v/v) for immersing the wood boards at 80° C. for 60 minutes, then reducing temperature to 30° C.-35° C. for 3 hours, in which adjusting the minimum pressure differential during the immersing of 0.5 bar, and gradually reducing to 0 bar for ending of immersing;
wherein the third salt solution has a concentration of 3M, in which the third salt solution includes a second salt mixture and the rest is water;
the third salt mixture include the monovalent cation combined from $NH_{4+}$ and $Na^+$, and the monovalent or multivalent anionic moiety creating mineral crystal combined from $SO_4^{2-}$, $PO_4^{3-}$, $B_4O_7^{2-}$, $HPO_4^{2-}$, and $H_2PO_4^-$; and the colloidal system has a concentration of 1.2%, in which the colloidal system is chitosan dissolved in aqueous acetic acid solution.

Example 4: Investigation of fire resistance of the modified American pine wood treated by method 100 and method 200.

(A) Sample Preparation:

Control sample is American pine without core that sawn into boards with a thickness of 3 cm, and left untreated.

Test samples are American pine without core that sawn into 3 cm thick boards, and treated similar to example 2; wherein the test samples are different in that:

sample 1: step (140) treating the wood for flame resistance with the third salt solution has a concentration of 1 M;

sample 2: step (140) treating the wood for flame resistance is repeated twice with the third salt solution has a concentration of 1 M;

sample 3 is the modified American pine wood is prepared according to example 2 described above; and sample 3' is the modified American pine wood is prepared according to example 3 described above.

Both the control sample and test samples were obtained from the same American pine tree.

(B) Method:

The method for evaluating the fire resistance of wood samples is based on the reference to the flame tube method presented in ASTM E69-50.

Equipment and tools: Electronic balance with 0.01 g accuracy, flame tube made of metal pipe ($\phi$ 50 mm, length 165 mm) with a sample holder at the tube's opening, alcohol lamp, stopwatch.

Procedure: Fix test samples 1-3, 3' and the control sample into the flame tube, ensuring that the sample extends 5 mm below the tube. Use the alcohol lamp to ignite the sample, positioning the flame tip exactly at the end of the sample section (10 mm away). The heating duration with the external heat source is 150 seconds, during which ignition time, smoldering time, mass loss, and mass loss ratio are recorded. The results are listed in Table 1 below.

TABLE 1

Fire resistance results of samples 1, 2, 3, and 3' compared to the control sample

| Parameters | Units | Control sample | Sample 1 | Sample 2 | Sample 3 | Sample 3' |
|---|---|---|---|---|---|---|
| Ignition time | Seconds (s) | 19 | 55 | 58 | 137 | 130 |
| Smoldering time | Seconds (s) | 55 | 30 | 36 | 0 | 5 |
| Mass loss ratio | Percent (%) | 15.99 | 13.05 | 10.14 | 0.92 | 1.20 |

(C) Results:

Based on Table 1, the fire resistance of the modified wood samples significantly improved compared to the control sample. The ignition time increased substantially, with Sample 3 exhibiting the highest resistance at 137 seconds, while Sample 3' had a slightly lower ignition time of 130 seconds. However, both were still significantly higher than the control sample (19 seconds) and the other treated samples (55 and 58 seconds for Sample 1 and Sample 2, respectively). Additionally, smoldering time decreased in the treated samples, with Sample 3 displaying the most notable improvement as it self-extinguished immediately (0 seconds). Meanwhile, Sample 3' had a slightly longer smoldering time of 5 seconds, though it was still much shorter than the control sample (55 seconds). Samples 1 and 2 also exhibited reduced smoldering times of 30 and 36 seconds, respectively. The mass loss ratio followed the same trend, with Sample 3 showing the lowest mass loss (0.92%), whereas Sample 3' exhibited a slightly higher value of 1.20%. Despite this, both Sample 3 and Sample 3' showed a drastic reduction in mass loss compared to the control sample (15.99%). Samples 1 and 2 also demonstrated improved fire resistance, with mass loss ratios of 13.05% and 10.14%, respectively.

Example 5: Investigation of fire resistance of the modified American pine wood treated by method 100 and method 200 based on sample position.

(A) Sample Preparation:

Test samples: American pine wood boards without a core and cut to a thickness of 3 cm, in which the boards were cut along the grain into three strips, designated from left to right as sample 1, sample 2, and sample 3. Among them, sample 1 and sample 3 are positioned at the edges, while sample 2 is in the center (which is the position near the core of the tree trunk). The test samples are different in that:

sample 1 is the modified American pine wood is prepared by method 200 according to example 3 described above;

sample 2 is the modified American pine wood is prepared by method 100 according to example 2 described above; and sample 3 the modified American pine wood is prepared by method 100 according to example 2 described above.

Both the control sample and test samples were obtained from the same American pine tree.

(B) Method:

The fire resistance assessment of the wood samples was conducted similarly to Example 4.

The test samples (Samples 1-3) and the control sample were fixed into the flame tube so that the sample extended 5 mm below the tube. An alcohol lamp was used to ignite the samples, with the flame tip precisely positioned at the end of the sample (10 mm away). The burning duration with the heat source was set to 150 seconds, during which the ignition time, smoldering time, mass loss, and mass loss ratio were recorded. The results are presented in Table 2 below.

TABLE 2

Fire resistance test results of modified American pine wood based on sample position

| Parameters | Units | Control sample | Sample 1 | Sample 2 | Sample 3 |
|---|---|---|---|---|---|
| Ignition time | Seconds (s) | 19 | 107 | 90 | 101 |
| Smoldering time | Seconds (s) | 55 | 14 | 17 | 13 |
| Mass loss ratio | Percent (%) | 15.99 | 0.61 | 1.21 | 0.66 |

Based on the results in Table 2, the fire resistance of modified American pine wood depends on the sample's position within the original wood plank. The ignition time of the treated samples significantly increased, with Sample 1 at 107 seconds, Sample 2 at 90 seconds, and Sample 3 at 101 seconds, compared to the control sample at 19 seconds. This indicates that the modification method greatly improved the wood's fire resistance. Notably, Sample 2, positioned in the center, had a shorter ignition time than the edge samples, suggesting differences in fire resistance based on location within the plank. The smoldering time was also significantly reduced in the modified samples, with Sample 1 at 14 seconds, Sample 2 at 17 seconds, and Sample 3 at 13 seconds, whereas the control sample had a smoldering time of 55 seconds. The mass loss ratio of the control sample was much higher at 15.99 percent, whereas the modified samples experienced minimal mass loss, with Sample 1 at 0.61 percent, Sample 2 at 1.21 percent, and Sample 3 at 0.66 percent. This confirms that the edge samples showed better fire resistance compared to the center sample.

Example 6: Investigation of swelling resistance of modified American pine wood treated by method 100.
Sample Preparation:
Control sample: American pine wood without the core, sawn into boards with a thickness of 3 cm, and left untreated.
Modified sample: the modified American pine wood treated by method 100 according to Example 2, with the difference that the modification was applied to the edge position of the board.
Both the control and modified samples were taken from the same American pine tree and from the edge position.
(B) Method:
The method for evaluating the swelling resistance of wood is based on the ISO 13061-16:2017 standard. The control and modified samples were fully immersed in water for 10 days, with data collected daily. The monitored technical parameters included water uptake rate, longitudinal swelling rate, radial swelling rate, tangential swelling rate, and volumetric swelling rate. The results are presented in Table 3 below.

(C) Results:
The data in Table 3 indicates that the modification treatment significantly reduces water absorption and swelling in the tested samples. On Day 1, the control sample (CS) absorbed 44.74% of water, whereas the modified sample (MS) absorbed only 20.86%. By Day 10, the water uptake in CS had increased to 61.12%, while MS remained lower at 47.79%. Swelling behavior analysis across longitudinal, radial, and tangential directions further highlights the effectiveness of the modification. Longitudinal swelling remained minimal, with MS exhibiting a notable reduction compared to CS (0.19% compared to 1.29% on Day 10). Radial swelling in CS reached 4.77%, whereas MS swelled only 3.32%. The most significant improvement was observed in tangential swelling, where CS expanded by 5.39%, while MS swelled only 1.20%. As a result, the volumetric swelling rate in MS was substantially lower (4.56%) compared to CS (10.42%).

Example 7: Investigation of the swelling resistance of modified American pine wood treated by method 100 based on sample position.
(A) Sample Preparation:
Modified sample at the edge position: This is the modified American pine wood board treated by method 100 according to Example 2, differing in that the modification was applied at the edge position.
Modified sample at the core position: This is the modified American pine wood board treated by method 100 according to Example 2, differing in that the modification was applied at the core position.
The modified samples at both the edge and core positions were taken from the same American pine tree.
(B) Method:
The method for evaluating the swelling resistance of wood is based on the ISO 13061-16:2017 standard.
The modified samples at the edge and core positions were fully immersed in water for 10 days, with data collected daily. The monitored technical parameters included longitudinal swelling rate, radial swelling rate, tangential swelling rate, and volumetric swelling rate. The results are presented in Table 4 below.

TABLE 3

Swelling resistance test results of the modified American pine wood treated by method 100

| Time | Water uptake rate (%) | | Longitudinal swelling rate (%) | | Radial swelling rate (%) | | Tangential swelling rate (%) | | Volumetric swelling rate (%) | |
|---|---|---|---|---|---|---|---|---|---|---|
| | CS | MS | CS | MS | CS | MS | CS | MS | CS | MS |
| Day 1 | 44.74 | 20.86 | 0.86 | 0.08 | 3.15 | 2.05 | 4.31 | 0.20 | 7.60 | 2.25 |
| Day 2 | 50.98 | 30.05 | 1.09 | 0.11 | 3.49 | 2.43 | 4.88 | 0.94 | 8.54 | 3.39 |
| Day 3 | 56.77 | 35.50 | 1.16 | 0.11 | 3.66 | 2.56 | 5.08 | 1.04 | 8.92 | 3.62 |
| Day 4 | 58.72 | 38.76 | 1.18 | 0.11 | 3.74 | 2.64 | 5.12 | 1.08 | 9.06 | 3.75 |
| Day 5 | 58.79 | 41.88 | 1.20 | 0.14 | 3.83 | 2.73 | 5.20 | 1.08 | 9.23 | 3.84 |
| Day 6 | 58.78 | 42.39 | 1.21 | 0.15 | 4.17 | 2.73 | 5.22 | 1.10 | 9.60 | 3.86 |
| Day 7 | 59.06 | 42.75 | 1.25 | 0.15 | 4.26 | 2.81 | 5.26 | 1.10 | 9.73 | 3.94 |
| Day 8 | 59.29 | 44.37 | 1.27 | 0.16 | 4.51 | 2.98 | 5.26 | 1.14 | 10.00 | 4.15 |
| Day 9 | 59.99 | 47.27 | 1.28 | 0.17 | 4.68 | 3.24 | 5.33 | 1.18 | 10.26 | 4.45 |
| Day 10 | 61.12 | 47.79 | 1.29 | 0.19 | 4.77 | 3.32 | 5.39 | 1.20 | 10.42 | 4.56 | in which: CS: Control sample; MS: Modified sample.

TABLE 4

Swelling resistance test results of modified American pine wood based on sample position

| Time | Longitudinal swelling rate (%) | | Radial swelling rate (%) | | Tangential swelling rate (%) | | Volumetric swelling rate (%) | |
|---|---|---|---|---|---|---|---|---|
|  | CP | EP | CP | EP | CF | EP | CP | EP |
| Day 1 | 0.13 | 0.08 | 3.50 | 2.05 | 0.20 | 0.20 | 3.70 | 2.25 |
| Day 2 | 0.20 | 0.11 | 3.67 | 2.43 | 0.94 | 0.94 | 4.64 | 3.39 |
| Day 3 | 0.24 | 0.11 | 4.01 | 2.56 | 1.04 | 1.04 | 5.09 | 3.62 |
| Day 4 | 0.26 | 0.11 | 4.09 | 2.64 | 1.10 | 1.08 | 5.23 | 3.75 |
| Day 5 | 0.29 | 0.14 | 4.18 | 2.73 | 1.14 | 1.08 | 5.36 | 3.84 |
| Day 6 | 0.27 | 0.15 | 4.35 | 2.73 | 1.14 | 1.10 | 5.53 | 3.86 |
| Day 7 | 0.30 | 0.15 | 4.77 | 2.81 | 1.18 | 1.10 | 6.01 | 3.94 |
| Day 8 | 0.37 | 0.16 | 6.56 | 2.98 | 1.47 | 1.14 | 8.13 | 4.15 |
| Day 9 | 0.42 | 0.17 | 6.91 | 3.24 | 1.61 | 1.18 | 8.62 | 4.45 |
| Day 10 | 0.45 | 0.19 | 6.99 | 3.32 | 1.88 | 1.20 | 9.00 | 4.56 | in which: CP: Modified sample at the core position; EP: Modified sample at the edge position.

(C) Results:

The results in Table 4 show that the swelling resistance of modified American pine wood is significantly influenced by the sample position. The modified samples at the edge position (EP) demonstrated superior resistance to swelling compared to those at the core position (CP). Over 10 days of water immersion, the longitudinal swelling rate of CP increased from 0.13% on Day 1 to 0.45% on Day 10, whereas EP remained lower, ranging from 0.08% to 0.19%. Similarly, the radial swelling rate in CP increased from 3.50% to 6.99%, while EP ranged from 2.05% to 3.32%. The tangential swelling rate also followed this trend, with CP rising from 0.20% to 1.88%, while EP exhibited a lower increase from 0.20% to 1.20%. Furthermore, the volumetric swelling rate in CP increased significantly from 3.70% on Day 1 to 9.00% on Day 10, whereas EP remained lower, ranging from 2.25% to 4.56%.

Example 8: Evaluation of swelling resistance of American pine wood treated by different methods.

(A) Sample Preparation:

Control sample: American pine wood without the core, sawn into boards with a thickness of 3 cm, and left untreated.

Test sample includes:

sample 1: the modified American pine wood board treated by method 100 according to Example 2, but the difference is that step (160) is not performed;

sample 2: the modified American pine wood board treated by method 100 according to Example 2.

Both the control sample and test samples were obtained from the same American pine tree.

(B) Method:

The method for evaluating the swelling resistance of wood is based on the ISO 13061-16:2017 standard. All samples were fully immersed in water. At selected time intervals (0, 2, 4, 12, 24, 36, 48, 72, 96, 120, 144, and 168 hours), the samples were removed from the solution and measured to calculate the volumetric swelling rate (%). The results of the experiment are presented in Table 5 below.

TABLE 5

Swelling resistance test results of American pine wood treated by different methods

| Time | Volumetric swelling rate (%) | | |
|---|---|---|---|
| (hour) | Control sample | Sample 1 | Sample 2 |
| 0 | 0.0 | 0.0 | 0.0 |
| 2 | 6.7 | 2.3 | 2.2 |
| 4 | 7.7 | 2.8 | 2.3 |
| 12 | 8.4 | 3.3 | 3.5 |
| 24 | 10.3 | 3.6 | 3.6 |
| 36 | 10.9 | 3.9 | 4.0 |
| 48 | 11.2 | 4.0 | 4.2 |
| 72 | 11.3 | 4.1 | 4.4 |
| 96 | 11.5 | 4.3 | 4.7 |
| 120 | 12.0 | 4.6 | 5.1 |
| 144 | 12.3 | 4.9 | 5.4 |
| 168 | 12.6 | 5.0 | 5.6 |

(C) Results:

Based on Table 5, the three conditions show distinct differences in water-induced swelling. After 2 hours, the control sample swelled to 6.7%, whereas the sample 1 and the sample 2 registered significantly lower values at 2.3% and 2.2%, respectively. By 4 hours, the control sample reached 7.7% swelling, while the sample 1 recorded 2.8% and the combined treatment maintained an even lower rate of 2.3%. During the subsequent period from 24 to 168 hours, although all samples experienced further swelling, the treated samples consistently remained well below the control sample's swelling levels. At 168 hours, the control sample exhibited approximately 12.6% swelling, compared to about 5.0% for the fire-resistant treatment alone and around 5.6% for the sample 2.

Example 9: Evaluation of the mechanical and physical properties of modified American pine wood using method 100 and method 200.

(A) Sample Preparation:

The control sample consisted of American pine wood without the core, cut into 3 cm thick boards, and left untreated.

The modified sample 1 is the modified American pine wood board treated by method 100 according to Example 2.

The modified sample 2 is the modified American pine wood board treated by method 200 according to Example 3.

Both the control and modified samples were taken from the same American pine tree.

(B) Method:

The control and modified samples were evaluated for mechanical and physical properties, including initial moisture content, bending strength, modulus of elasticity in bending, static hardness, and volumetric expansion at 48 hours. These mechanical and physical indicators were assessed according to the ISO 13061 standard. The evaluation results are presented in Table 6.

TABLE 6

Evaluation results of the mechanical and physical properties of modified American pine wood

| Parameters | Standard | Units | Control sample | Modified sample 1 | Modified sample 2 |
| --- | --- | --- | --- | --- | --- |
| Initial moisture content | ISO 13061 - 1:2014 | % | 14.8 | 23.2 | 21.5 |
| Bending strength | ISO 13061 - 3:2014 | MPa | 113.4 | 109.7 | 111.0 |
| Modulus of elasticity in bending | ISO 13061 - 4:2014 | MPa | 10,901 | 11,244 | 11,050 |
| Static hardness (Load at 2.82 mm) | ISO 13061 - 12:2017 | N | 2,216 | 2,405 | 2,330 |
| Static hardness (Load at 5.64 mm) | ISO 13061 - 12:2017 | N | 4,055 | 4,679 | 4,450 |
| Volumetric expansion at 48 hours | ISO 13061 - 16:2017 | % | 15.0 | 13.5 | 14.0 |

(C) Results:

The results in Table 5 indicate that both Modified sample 1 and Modified sample 2 exhibited improved mechanical and physical properties compared to the Control sample, with Modified sample 2 performing slightly lower than Modified sample 1 but still superior to the Control sample. The initial moisture content was highest in Modified sample 1 (23.2%), followed by Modified sample 2 (21.5%), and lowest in the Control sample (14.8%), reflecting the degree of modification. In terms of bending strength, Modified sample 1 showed a slight decrease (109.7 MPa) compared to the Control sample (113.4 MPa), while Modified sample 2 (111.0 MPa) retained more strength. The modulus of elasticity in bending improved in both modified samples, with Modified sample 1 (11,244 MPa) performing slightly better than Modified sample 2 (11,050 MPa), both exceeding the Control sample (10,901 MPa). Static hardness increased significantly in both modified samples at both 2.82 mm and 5.64 mm loads, with Modified sample 1 achieving the highest values (2,405 N and 4,679 N), followed by Modified sample 2 (2,330 N and 4,450 N), both surpassing the Control sample (2,216 N and 4,055 N). Volumetric expansion after 48 hours was reduced in the modified samples, with Modified sample 1 showing the lowest swelling (13.5%), followed by Modified sample 2 (14.0%), both lower than the Control sample (15.0%).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, element components, and/or groups thereof.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order, or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method for the modification of wood materials to improve mechanical properties, water resistance and flame retardancy by utilizing a combination of mineralization with infusion and polymerization of biopolymers, comprising:
    (i) preparing and pre-treating wood materials comprising:
        (a) sawing wood materials into wood boards with a maximum thickness of 6 cm, in which the wood materials include softwood and sapwood;
            wherein the softwood materials include pine, American pine, yellow pine, white pine, yellow poplar, tamarind, acacia, cajuput, cinnamon, rubber, eucalyptus, ash, oak, red oak, black walnut, teak, American cherry, cedar, bread tree, sapele, and neem;
(b) soaking the wood boards in 0.5%-1.5% $Ca(OH)_2$ solution at a ratio of 1:2 (w/v) for 12-72 hours; and
(c) washing the wood boards from step (b) with water, and drying to a moisture content below 20% to obtain treated wood boards;

(ii) hardening the pre-treated wood boards via the creation and deposition of mineral crystal or metal oxide inside the wood fiber, including steps:
(a1) adding the pre-treated wood boards into an immersion equipment, setting a negative pressure of −0.5 to −1 bar maintained for 30-90 minutes, then adding a first salt solution into the equipment at a ratio of 1:2 (w/v) for immersing the pretreated wood boards with pH 2-4, at 40° C.-50° C. for 30-45 minutes, then reducing temperature to 25° C.-30° C. for 0.5-3 hours;
wherein the first salt solution has a concentration of 10%-20%;
the first salt solution includes a sodium carboxymethyl cellulose (NaCMC) component or a carboxymethyl cellulose (CMC) component, a first salt mixture, and the rest is water;
in which a ratio between the sodium carboxymethyl cellulose (NaCMC) component or the carboxymethyl cellulose (CMC) component and the first salt is 1:(25-75);
the first salt mixture includes a monovalent or multivalent anionic moiety creating mineral crystal, and a monovalent cation moiety;
the monovalent cation is selected from the group consisting of $Na^+$, $NH_4^+$, and combinations thereof;
the monovalent or multivalent anionic moiety creating the mineral crystal is selected from the group consisting of $HCO_3^-$, $CO_3^{2-}$; $PO_4^{3-}$, $HPO_4^{2-}$, $H_2PO^{4-}$, $SiO_3^{2-}$, $SO_4^{2-}$, $B_4O_7^{2-}$, and combinations thereof;
(a2) adding the wood boards from step (a1) to another immersion equipment, setting a negative pressure of −0.5 to −1.0 bar maintained for 60-120 minutes, then adding a second salt solution into the equipment at a ratio of 1:2 (w/v) for immersing the wood boards for 1-3 hours;
wherein the second salt solution has a concentration of 10%-20%;
the second salt solution includes a second salt mixture, and the rest is water, in which the second salt solution is obtained by homogeneously dissolving the second salt mixture with a molar mass of 5-10 mol with 5 liters of water;
the second salt mixture includes a divalent metal cation moiety creating mineral crystal, and a monovalent or multivalent anionic moiety;
the divalent metal cation moiety creating mineral crystal is selected from the group consisting of $Mg^{2+}$, $Ca^{2+}$, $Cu^{2+}$, and combinations thereof;
the monovalent or multivalent anionic moiety is selected from the group consisting of $Cl^-$, $NO_3^-$, an anion of formic acid ($HCOO^-$), and anion of acetic acid ($CH_3COO^-$), and anion of citric acid ($C_3H_5O(COO)_3^{3-}$), and combinations thereof; and
(iii) washing the wood boards from step (ii) with water, and drying to a moisture content below 20%;

(iv) treating the wood for flame resistance by adding the treated wood boards from step (iii) into another immersion equipment, setting a negative pressure of −0.5 to −1.0 bar maintained for 90-150 minutes, then adding a third salt solution into the equipment at a ratio of 1:2 (w/v) for immersing the wood boards for 1-3 hours;
wherein the third salt solution has a concentration of 20%-40%;
the third salt solution includes a third salt mixture, and the rest is water;
the third salt mixture includes a monovalent or multivalent anionic moiety, and a monovalent cation moiety;
the monovalent cation moiety is selected from the group consisting of $Na^+$, $NH^{4+}$, and combinations thereof; and
the monovalent or multivalent anionic moiety is selected from the group consisting of $PO_4^{3-}$, $HPO_4^{2-}$, $H_2PO_4^-$, $SiO_3^-$, $SO_4^{2-}$, $B_4O_7^{2-}$, and combinations thereof;
(v) treating the wood for water resistance by immersing the wood boards from step (iv) in a colloidal system at a ratio of 1:2 (v/v) at 70° C. for 1-3 hours;
wherein the colloidal system has a concentration of 0.2%-2%;
the colloidal system is selected from the group consisting of pectin, chitosan, lignin, and combinations thereof;
in which the combination of colloidal system is chitosan and lignin;
(vi) adding the wood boards from step (v) into another immersion equipment, setting the negative pressure of −0.5 to −1.0 bar maintained for 120-180 minutes, then adding a fourth salt solution into the equipment at a ratio of 1:2 (w/v) for immersing the wood boards at 70° C.-90° C. for 30-60 minutes, then reducing temperature to 30° C.-35° C. for 3-4 hours;
wherein the fourth salt solution has a concentration of 10%-20%, in which the fourth salt solution includes a sodium carboxymethyl cellulose (NaCMC) component or a carboxymethyl cellulose (CMC) component, the second salt mixture, and the rest is water;
in which a ratio between the sodium carboxymethyl cellulose (NaCMC) component or the carboxymethyl cellulose (CMC) component and the second salt mixture by mass is 1:(25-75);
the second salt mixture includes the divalent metal cation moiety creating mineral crystal, and the monovalent or multivalent anionic moiety;
the divalent metal cation moiety creating mineral crystal is selected from the group consisting of $Mg^{2+}$, $Ca^{2+}$, $Cu^{2+}$, and combinations thereof;
the monovalent or multivalent anionic moiety is selected from the group consisting of $Cl^-$, $NO_3^-$, an anion of formic acid ($HCOO^-$), an anion of acetic acid ($CH_3COO^-$), an anion of citric acid ($C_3H_5O(COO)_3^{3-}$), and combinations thereof; and
(vii) drying the wood boards from step (vi) to a moisture content of 10%±2% to obtain a modified wood.

2. The method of claim 1, wherein, in step (ii) step (ii)(a2) is performed before step (ii)(a1).

3. The method of claim 1, wherein step (ii) is repeated up to three times.

4. The method of claim 3, wherein step (ii) is repeated once for ash wood.

5. The method of claim 3, wherein step (ii) is repeated twice for American pine.

6. The method of claim 1, wherein the first salt mixture is selected from the group consisting of:
- group A1: the first salt mixture includes the monovalent cation $NH_4^+$, and the monovalent or multivalent anionic moiety creating mineral crystal combined of $CO_3^{2-}$, $SO_4^{2-}$, $PO_4^{3-}$, $HCO_3^-$, $HPO_4^{2-}$, and $H_2PO_4^-$;
- group B1: the first salt mixture includes the monovalent cation combined of $NH_4^+$ and $Na^+$, and the monovalent or multivalent anionic moiety creating mineral crystal combined of $CO_3^{2-}$, $SO_4^{2-}$, $PO_4^{3-}$, $B_4O_7^{2-}$, $HCO_3^-$, $HPO_4^{2-}$, and $H_2PO_4^-$; and
- group C1: the first salt mixture includes the monovalent cation $Na^+$, and the monovalent or multivalent anionic moiety creating mineral crystal combined of $CO_3^{2-}$, $SO_4^{2-}$, $PO_4^{3-}$, $B_4O_7^{2-}$, $SiO_3^{2-}$, $HCO_3^-$, $HPO_4^{2-}$, and $H_2PO_4^-$.

7. The method of claim 1, wherein the second salt solution has a concentration of 12%-15%, in which the second salt solution contains the second salt mixture which is a simple salt including $MgCl_2$, $Mg(NO_3)_2$, $(HCOO)_2Mg$, $(CH_3COO)_2Mg$, $(C_3H_5O(COO)_3)_2Mg$, $CaCl_2$, $Ca(NO_3)_2$, $(HCOO)_2Ca$, $(CH_3COO)_2Ca$, $(C_3H_5O(COO)_3)_2Ca$, $CaCl_2$, $Cu(NO_3)_2$, and $(CH_3COO)_2Cu$.

8. The method of claim 1, wherein the second salt mixture is selected from the group consisting of:
- group A2: the second salt mixture includes the divalent metal cation moiety creating mineral crystal $Ca^{2+}$, and the monovalent or multivalent anionic moiety combined of $Cl^-$, $NO_3^-$, $HCOO^-$, $CH_3COO^-$, and $C_3H_5O(COO)_3^{3-}$;
- group B2: the second salt mixture includes the divalent metal cation moiety creating mineral crystal combined of $Ca^{2+}$ and $Cu^{2+}$, and the monovalent or multivalent anionic moiety combined of $Cl^-$, $NO_3^-$, $HCOO^-$, $CH_3COO^-$, and $C_3H_5O(COO)_3^{3-}$;
- group C2: the second salt mixture includes the divalent metal cation moiety creating mineral crystal combined of $Ca^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$;
- group D2: the second salt mixture includes the divalent metal cation moiety creating mineral crystal combined of $Cu^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$; and
- group E2: the second salt mixture includes the divalent metal cation moiety creating mineral crystal combined of $Ca^{2+}$, $Cu^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$.

9. The method of claim 1, wherein the third salt mixture is selected from the group consisting of:
- group A3: the third salt mixture includes the monovalent cation $NH_{4+}$, and the monovalent or multivalent anionic moiety combined of $SO_4^{2-}$, $PO_4^{3-}$, $HPO_4^{2-}$, and $H_2PO_4^-$;
- group B3: the third salt mixture includes the monovalent cation combined of $NH_{4+}$ and $Na^+$, and the monovalent or multivalent anionic moiety combined of $SO_4^{2-}$, $PO_4^{3-}$, $B_4O_7^{2-}$, $HPO_4^{2-}$, and $H_2PO_4^-$; and
- group C3: the monovalent cation $Na^+$, and the monovalent or multivalent anionic moiety combined of $SiO_3^{2-}$, $B_4O_7^{2-}$, $PO_4^{3-}$, $HPO_4^{2-}$, and $H_2PO_4^-$.

10. The method of claim 1, wherein adjusting the pressure differential during the immersing in order −0.8 bar, −0.5 bar, and −0.1 bar.

11. A method for the modification of wood materials to improve mechanical properties, water resistance and flame retardancy by utilizing a combination of mineralization with infusion and polymerization of biopolymers, comprising:
(i') preparing and pre-treating wood materials comprising:
- (a') sawing wood materials into wood boards with a maximum thickness of 6 cm, in which the wood materials include softwood and sapwood;
  wherein the softwood materials include pine, American pine, yellow pine, white pine, yellow poplar, tamarind, acacia, cajuput, cinnamon, rubber, eucalyptus, ash, oak, red oak, black walnut, teak, American cherry, cedar, bread tree, sapele, and neem;
- (b') soaking the wood boards in 0.5%-1.5% $Ca(OH)_2$ solution at a ratio of 1:2 (w/v) for 12-72 hours; and
- (c') washing the wood boards from step (b) with water, and drying to a moisture content below 20% to obtain treated wood boards;

(ii') hardening the pre-treated wood boards via the creation and deposition of mineral crystal or metal oxide inside the wood fiber, including steps:
- (a1') adding the pre-treated wood boards into an immersion equipment, setting a negative pressure of −0.5 to −1 bar maintained for 30-90 minutes, then adding a first salt solution into the equipment at a ratio of 1:2 (w/v) for immersing the pretreated wood boards with pH 2-4, at 40° C.-50° C. for 30-45 minutes, then reducing temperature to 25° C.-30° C. for 0.5-3 hours;
  wherein the first salt solution has a concentration of 10%-20%;
  the first salt solution includes a sodium carboxymethyl cellulose (NaCMC) component or a carboxymethyl cellulose (CMC) component, a first salt mixture, and the rest is water;
  in which a ratio between the sodium carboxymethyl cellulose (NaCMC) component or the carboxymethyl cellulose (CMC) component and the first salt is 1:(25-75);
  the first salt mixture includes a monovalent or multivalent anionic moiety creating mineral crystal, and a monovalent cation moiety;
  the monovalent cation is selected from the group consisting of $Na^+$, $NH_{4+}$, and combinations thereof;
  the monovalent or multivalent anionic moiety creating the mineral crystal is selected from the group consisting of $HCO^{3-}$, $CO_3^{2-}$; $PO_4^{3-}$, $HPO_4^{2-}$, $H_2PO^{4-}$, $SiO_3^{2-}$, $SO_4^{2-}$, $B_4O_7^{2-}$, and combinations thereof;
- (a2') adding the wood boards from step (a1') to another immersion equipment, setting a negative pressure of −0.5 to −1.0 bar maintained for 60-120 minutes, then adding a second salt solution into the equipment at a ratio of 1:2 (w/v) for immersing the wood boards for 1-3 hours;
  wherein the second salt solution has a concentration of 10%-20%;
  the second salt solution includes a second salt mixture, and the rest is water, in which the second salt solution is obtained by homogeneously dissolving the second salt mixture with a molar mass of 5-10 mol with 5 liters of water;

the second salt mixture includes a divalent metal cation moiety creating mineral crystal, and a monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO_3^-$, an anion of formic acid ($HCOO^-$), and anion of acetic acid ($CH_3COO^-$), and anion of citric acid ($C_3H_5O(COO)_3^{3-}$), and combinations thereof; and (iii') washing the wood boards from step (ii') with water, and drying to a moisture content below 20%;

(iv') treating the wood for flame resistance by adding the treated wood boards from step (iii') into another immersion equipment, setting a negative pressure of −0.5 to −1.0 bar maintained for 90-150 minutes, then adding a third salt solution and a colloidal system into the equipment at a ratio of 1:2 (w/v) for immersing the wood boards for 1-3 hours;

wherein the third salt solution has a concentration of 20%-40%;

the colloidal system has a concentration of 0.2%-2%, in which the colloidal system is chitosan or chitosan and lignin;

the third salt solution includes a third salt mixture, and the rest is water, wherein the third salt mixture includes a monovalent or multivalent anionic moiety, and a monovalent cation moiety;

the monovalent cation moiety is selected from the group consisting of $Na^+$, $NH^{4+}$, and combinations thereof; and the monovalent or multivalent anionic moiety is selected from the group consisting of $PO_4^{3-}$, $HPO_4^{2-}$, $H_2PO_4^-$, $SiO_3^-$, $SO_4^{2-}$, $B_4O_7^{2-}$, and combinations thereof;

(v') treating the wood for water resistance by immersing the wood boards from step (iv') into another immersion equipment, setting the negative pressure of −0.5 to −1.0 bar maintained for 120-180 minutes, then adding a fourth salt solution into the equipment at a ratio of 1:2 (w/v) for immersing the wood boards at 70° C.-90° C. for 30-60 minutes, then reducing temperature to 30° C.-35° C. for 3-4 hours; a colloidal system at a ratio of 1:2 (v/v) at 70° C. for 1-3 hours;

wherein the fourth salt solution has a concentration of 10%-20%, in which the fourth salt solution includes a sodium carboxymethyl cellulose (NaCMC) component or a carboxymethyl cellulose (CMC) component, the second salt mixture, and the rest is water;

in which a ratio between the sodium carboxymethyl cellulose (NaCMC) component or the carboxymethyl cellulose (CMC) component and the second salt mixture by mass is 1:(25-75);

the second salt mixture includes the divalent metal cation moiety creating mineral crystal, and the monovalent or multivalent anionic moiety;

the divalent metal cation moiety creating mineral crystal is selected from the group consisting of $Mg^{2+}$, $Ca^{2+}$, $Cu^{2+}$, and combinations thereof;

the monovalent or multivalent anionic moiety is selected from the group consisting of $Cl^-$, $NO_3^-$, an anion of formic acid ($HCOO^-$), an anion of acetic acid ($CH_3COO^-$), an anion of citric acid ($C_3H_5O(COO)_3^{3-}$), and combinations thereof; and (vi') drying the wood boards from step (v') to a moisture content of 10%±2% to obtain a modified wood.

12. The method of claim 11, wherein, in step (ii') step (ii')(a2') is performed before step (ii')(a1').

13. The method of claim 11, wherein step (ii') is repeated up to three times.

14. The method of claim 13, wherein step (ii') is repeated once for ash wood.

15. The method of claim 13, wherein step (ii') is repeated twice for American pine.

16. The method of claim 11, wherein the first salt mixture is selected from the group consisting of:

group A1: the first salt mixture includes the monovalent cation $NH_{4+}$, and the monovalent or multivalent anionic moiety creating mineral crystal combined of $CO_3^{2-}$, $SO_4^{2-}$, $PO_4^{3-}$, $HCO_3^-$, $HPO_4^{2-}$, and $H_2PO_4^-$;

group B1: the first salt mixture includes the monovalent cation combined of $NH_{4+}$ and $Na^+$, and the monovalent or multivalent anionic moiety creating mineral crystal combined of $CO_3^{2-}$, $SO_4^{2-}$, $PO_4^{3-}$, $B_4O_7^{2-}$, $HCO_3^-$, $HPO_4^{2-}$, and $H_2PO_4^-$; and group C1: the first salt mixture includes the monovalent cation $Na^+$, and the monovalent or multivalent anionic moiety creating mineral crystal combined of $CO_3^{2-}$, $SO_4^{2-}$, $PO_4^{3-}$, $B_4O_7^{2-}$, $SiO_3^{2-}$, $HCO_3^-$, $HPO_4^{2-}$, and $H_2PO_4^-$.

17. The method of claim 11, wherein the second salt solution has a concentration of 12%-15%, in which the second salt solution contains the second salt mixture which is a simple salt including $MgCl_2$, $Mg(NO_3)_2$, $(HCOO)_2Mg$, $(CH_3COO)_2Mg$, $(C_3H_5O(COO)_3)_2Mg$, $CaCl_2$, $Ca(NO_3)_2$, $(HCOO)_2Ca$, $(CH_3COO)_2Ca$, $(C_3H_5O(COO)_3)_2Ca$, $CaCl_2$, $Cu(NO_3)_2$, and $(CH_3COO)_2Cu$.

18. The method of claim 11, wherein the second salt mixture is selected from the group consisting of:

group A2: the second salt mixture includes the divalent metal cation moiety creating mineral crystal $Ca^{2+}$, and the monovalent or multivalent anionic moiety combined of $Cl^-$, $NO_3^-$, $HCOO^-$, $CH_3COO^-$, and $C_3H_5O(COO)_3^{3-}$;

group B2: the second salt mixture includes the divalent metal cation moiety creating mineral crystal combined of $Ca^{2+}$ and $Cu^{2+}$, and the monovalent or multivalent anionic moiety combined of $Cl^-$, $NO_3^-$, $HCOO^-$, $CH_3COO^-$, and $C_3H_5O(COO)_3^{3-}$;

group C2: the second salt mixture includes the divalent metal cation moiety creating mineral crystal combined of $Ca^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$;

group D2: the second salt mixture includes the divalent metal cation moiety creating mineral crystal combined of $Cu^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$; and group E2: the second salt mixture includes the divalent metal cation moiety creating mineral crystal combined of $Ca^{2+}$, $Cu^{2+}$ and $Mg^{2+}$, and the monovalent or multivalent anionic moiety combined of $Cl^-$, $NO_3^-$, $HCOO^-$, $CH_3COO^-$, and $C_3H_5O(COO)_3^{3-}$.

19. The method of claim 11, wherein the third salt mixture is selected from the group consisting of:

group A3: the third salt mixture includes the monovalent cation $NH_{4+}$, and the monovalent or multivalent anionic moiety combined of $SO_4^{2-}$, $PO_4^{3-}$, $HPO_4^{2-}$, and $H_2PO_4^-$;

group B3: the third salt mixture includes the monovalent cation combined of $NH_{4+}$ and $Na^+$, and the monovalent or multivalent anionic moiety combined of $SO_4^{2-}$, $PO_4^{3-}$, $B_4O_7^{2-}$, $HPO_4^{2-}$, and $H_2PO_4^-$; and group C3: the monovalent cation $Na^+$, and the monovalent or multivalent anionic moiety combined of $SiO_3^{2-}$, $B_4O_7^{2-}$, $PO_4^{3-}$, $HPO_4^{2-}$, and $H_2PO_4^-$.

20. The method of claim 11, wherein adjusting the pressure differential during the immersing in order −0.8 bar, −0.5 bar, and −0.1 bar.

\* \* \* \* \*